United States Patent [19]

Mielenz

[11] Patent Number: 5,405,123
[45] Date of Patent: Apr. 11, 1995

[54] VACUUM CLAMPING PLATE

[75] Inventor: Heinz Mielenz, Lossburg, Germany

[73] Assignee: Mielenz GmbH, Lossburg, Germany

[21] Appl. No.: 184,987

[22] Filed: Jan. 24, 1994

[30] Foreign Application Priority Data

Jan. 29, 1993 [DE] Germany .................. 43 02 440.8

[51] Int. Cl.⁶ .............................................. B25B 11/00
[52] U.S. Cl. ........................................ 269/21; 269/99
[58] Field of Search ................... 269/21, 20, 99–100;
51/235; 248/362, 363; 294/64 R, 65

[56] References Cited

U.S. PATENT DOCUMENTS

| | | |
|---|---|---|
| 2,729,040 | 1/1956 | Wallace et al. |
| 3,720,433 | 3/1973 | Rosfelder . |
| 4,066,249 | 1/1978 | Huber et al. ............... 269/21 |
| 4,139,051 | 2/1979 | Jones et al. ............... 269/21 |
| 4,551,192 | 11/1985 | DiMilia et al. ............ 269/21 |
| 4,684,113 | 8/1987 | Douglas et al. ........... 269/21 |
| 4,881,727 | 11/1989 | Nemlrovsky .............. 269/309 |
| 5,098,508 | 3/1992 | Mattil ....................... 269/21 |
| 5,226,636 | 7/1993 | Nenadic et al. ........... 269/21 |
| 5,234,205 | 8/1993 | Shanley .................... 269/99 |

FOREIGN PATENT DOCUMENTS

| | | |
|---|---|---|
| 0175295 | 3/1986 | European Pat. Off. . |
| 3434328C1 | 4/1986 | Germany . |
| 3437604A1 | 4/1986 | Germany . |
| 3838988C1 | 12/1989 | Germany . |
| 4000099A1 | 7/1991 | Germany . |

Primary Examiner—Robert C. Watson
Attorney, Agent, or Firm—Frishauf, Holtz, Goodman & Woodward

[57] ABSTRACT

A vacuum clamp plate is built up from a plurality of clamp plate sections (1, 2), as building blocks. Hexagonal and pentagonal base patterns are provided in the buildingblock structure and on its top, each clamp plate section has a groove grid (18). The clamp plate sections (1, 2) are connected to each other by coupling elements that also serve to carry the vacuum.

25 Claims, 5 Drawing Sheets

VACUUM CLAMPING PLATE

FIELD OF THE INVENTION

The present invention relates to a vacuum clamping plate that is particularly well suited for holding non-magnetic work pieces on the tables of metal-cutting tools so that work can be done on the work pieces.

BACKGROUND

German patent 38 38 988 describes a vacuum clamping plate which is in the form of a rectangular block with a square base. In the top of the vacuum clamping plate there is an orthogonal grid of grooves between which there are elevations of equal height that are in the shape of small table mountains. The tops of the elevations are flat and all the elevations lie in a common plane that forms the supporting surface for the work piece that is to be cut by the machine.

Inside the vacuum clamping plate there is a chamber that is connected through a plurality of bore holes with the grooves in the top of the vacuum clamping plate so as to provide a flow path. In addition, there are additional openings on the side of the vacuum clamping plate, through which a vacuum source can be connected to the chamber in the vacuum clamping plate through control valves.

In order that the work pieces can always be installed in the same place in the clamp plate when there are a number of identical work pieces that have to be machined in sequence, stops are provided and these can be adjusted and held in position on the clamping surface of the vacuum clamping plate. These stops are secured with the help of T-groove bolts and T-grooves that run around the outer edge of the vacuum clamping plate. This prevents breaks in the groove pattern by the attachment means that have an additional positive locking effect. Such interruptions (breaks) would adversely affect the sealing of the work piece to the top of the vacuum clamping plate, or complicate this process unnecessarily.

In addition, the stops, too, are provided with a grid of grooves in order to provide lateral support for the work piece that is to be machined.

The known vacuum clamping plate is supplied in a size that is established by the manufacturer. It cannot be configured with different dimensions so as to satisfy varying demands.

SUMMARY OF THE INVENTION

Proceeding from this, it is an aim of the present invention to create a vacuum clamping plate that can be matched to particular requirements in a modular fashion or in the manner of building blocks, in order that it can be adapted both to small as well as to large machine tools.

Briefly, the new vacuum clamping plate includes at least two clamping plates that can be assembled in a modular fashion, and which are matched to the special requirements demanded by enlargement. Vacuum clamping plates can be assembled to almost any desired size. The user of the vacuum clamping plates is no longer restricted to a size that is established by the manufacturer and which is too small for some applications, and too large for other applications. In addition, this saves the user considerable costs, for the price of the vacuum clamping plate is determined to a very large extent from the size of the clamping surface that incorporates the waffle pattern.

In order to permit modular assembly, each clamping plate has connecting channels in the side wall(s) that are provided for connecting additional clamping plates, so that the vacuum can pass from one section of clamping plate to the other section of clamping plate. This makes it possible to eliminate costly coupling by way of external hoses or pipes.

In addition, installing the work pieces is very simple because each section of the clamping plate incorporates at least one valve through which the groove grid is connected to the chamber within the interior of the section of clamping plate. The valve has an operating element that is activated or opened when the work piece is positioned on the clamping plate. This means that when there is no work piece in position, the valve is automatically closed and there are no leaks that could have an adverse effect on the vacuum or lead to the fact that, for example, cooling liquid is drawn into the vacuum system. On the other hand, however, the user is not compelled to open or close openings in the groove grid beneath the work piece, as may be required. This means that operating errors are precluded.

This form of automatic connection of the particular groove grid to the vacuum system is particularly important since, because of the division of the overall vacuum clamping plate into individual clamping plate sections, the groove pattern cannot, of necessity, continue beyond the border between two adjacent clamping plate sections, but must at this point be provided with a continuous strip, the height of this being equal to the elevations that are divided up by the groove pattern. Only in this way is it possible to generate individual vacuum fields that form the total vacuum clamping plate, the borders of which are as close as possible to the border between two adjacent sections of clamping plate. In any other case, the vacuum surface would be unnecessarily small, which would have an adverse effect on its holding power because, in vacuum clamping systems, holding power is proportional to the surface upon which the vacuum acts.

In addition, this rail prevents errors that occur if the user attempts to install the necessary rubber sealing strip across the border between two clamping plate sections. The join between two adjacent vacuum clamping plates, which is not air-tight, would then of necessity result in leaks, which could have a dangerous effect on the vacuum beneath the work piece.

When the vacuum clamping plate is assembled from clamping plate sections, particularly favorable conditions result if an hexagonal shape is used as the basic shape. This permits any enlargement of the effective surface of the clamping plate that is assembled from these, without any gaps.

A further improvement can be achieved if clamping plate sections that are used, especially, at the edge of the vacuum plate that has been assembled in a modular fashion and which are pentagonal, in that one side is suitable for connection to a hexagonal base, whereas the distance between two side walls that are parallel to each other corresponds to the distance between two side walls on the base pattern of the clamping plate sections that are parallel to each other. In this way, it is possible to construct a rectangular vacuum clamping plate despite a basic pattern that is essentially hexagonal, and once again there are additional T-grooves at the edges of the assembled vacuum clamping plate, in order to bolt on stops for positioning or securing the work piece that is installed, without placing any additional load on the vacuum by so doing.

The chamber that is provided within the clamping plate section consists, in the simplest case, of a circular recess into which a shoulder extends radially in order that a cover for the chamber can be sealed in position with the help of the shoulder. Then, the individual connecting channels radiate out from the chamber. In addition, this arrangement entails the advantage that the cover can be manufactured from a material that is different from the material used for the base body of the clamping plate section. In order to save weight, it is preferred that the base body consist of a light metal so that the vacuum clamping plate can be secured in a simple manner on a magnetic clamping plate with the help of a cover that is manufactured from ferro-magnetic material, which is of particular advantage when used on grinding machines.

It is made easier to couple the clamping plate sections if the bores in which the connecting channels end at the particular side walls are located at the approximate mid-point of the diagonals of the rectangular side walls or, in the case of pentagonal plates, on the long side walls at a distance from the corner that equals the distance of these drillings from the corners in the case of hexagonal clamping plate sections.

A further simplification can be achieved if these bores are stepped bores in which sealed pipe sections can be inserted in order to connect adjacent clamping plate sections mechanically and so as to provide a flow. This eliminates the need for additional retaining elements that secure the clamping plate sections to each other, and this is particularly important in the case of those clamping plate sections which have small side surfaces that lie on the edge of the vacuum clamping plate that has been assembled, in the case of large vacuum clamping plates. In the event that height adjustment by way of the inserted pipe sections cannot provide for sufficiently small tolerances, one or more precision bores to accommodate precision pins can be made in the side walls. These then secure the assembled clamping plate sections only against moving in the direction parallel to the side walls, whereas security vertical to the particular side walls is effected, as described, by the pipe sections through which the vacuum chambers are connected to each other.

In the simplest case, the pipe sections are fixed in the bores with bolts, preferably threaded pins, that are screwed in from the underside of the clamping plate section. The pointed end of this works in conjunction with the grooves in these pipe sections and presses the pipe sections against the bottom of the stepped bore. At the same time, the sealing can be effected very simply at this point if the O-rings provided for this purpose are not to be chambered in the grooves of the pipe sections.

BRIEF DESCRIPTION OF THE DRAWINGS

Embodiments of the present invention are shown in the drawings appended hereto. These drawings show the following.

DETAILED DESCRIPTION OF THE INVENTION

Figure 1:
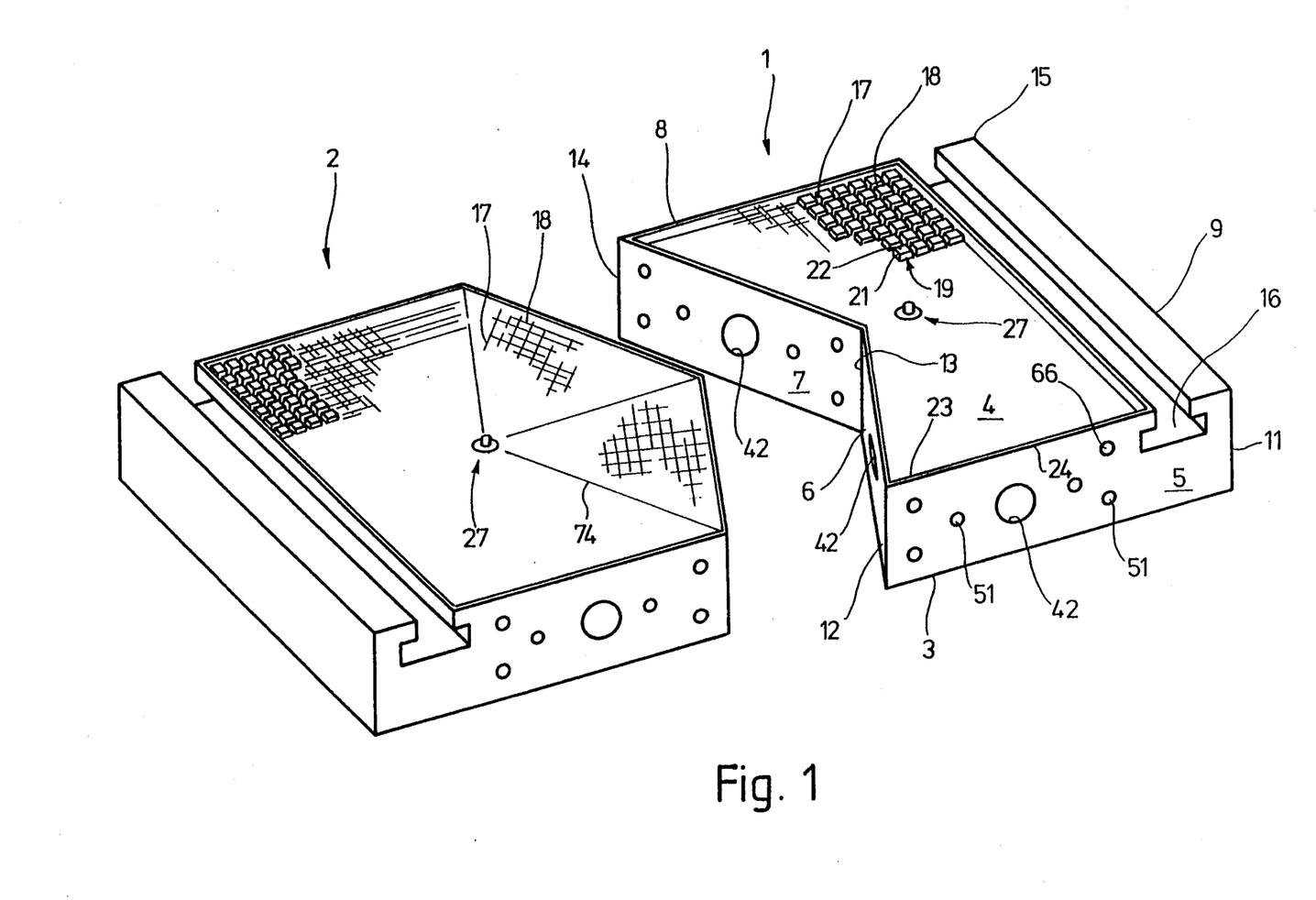
FIG. 1 is a perspective view of two clamp plate sections that are unassembled.

FIG. 1 shows two clamp plate sections 1 and 2 that can be assembled to form a vacuum clamp plate. Apart from a different base outline, the two clamp plate sections 1 and 2 have the same structure, for which reason the parts that correspond to each other bear the same reference numbers and the following description of the drawing is based exclusively on clamp plate section 1.

The clamping plate section 1 has an essentially flat underside 3 that faces away from the observer, and an upper surface 4 that is parallel to and spaced apart from this. Between the upper side 4 and the lower side 3, at right angles to both these, there extends a total of five side surfaces 5, 6, 8 and 9 that are joined at the corners 11, 12, 13 and 15. The angle subtended between the side surfaces 8 and 9 and the corner 15 is 90°, like the angle subtended between the side surfaces 5 and 6 at the corner 11. In contrast to this, the angle between the sides 3 and 6 or between the side surfaces 7 and 8, respectively, at the corners 12 and 14 is in each instance 60°, so that the angle at the corner 13 is 240°, i.e., what results at this point is a concave indented area in the clamp plate section 1. The side surfaces 3 . . . 9 are flat, smooth surfaces without any projections.

In the upper surface 4, adjacent to the side surface 9 and parallel to this there is a T-groove 16 that is open at the top and which passes through the side surface 5 and the side surface 8.

On the side of the T-groove 16 that is remote from the side surface 9 there is a grid of equal grooves in the top 4, this being formed from a group of grooves 17 and a group of grooves 18. The grooves 18 are spaced equidistantly apart and are parallel to the side surfaces 5 and 8, whereas the grooves 17, which are similarly spaced equidistantly apart, are parallel to the side surface 9. This results in small elevations 19 that are in the form of truncated pyramids and with a square base shape that are defined by a total of small four side surfaces 21 and a similarly square top surface 22. All the top surfaces 22 are in a common plane, that also contains the surface areas that are on the edges of the T-groove 16 at the top 4. These top surfaces 24 form the actual supporting surface for a work piece that is to be clamped.

But the grooves 17 and 18 do not extend as far as the side surfaces 5, 6, 7 and 8, and they also end at a distance from the edge of the T-groove 16, and this results in a narrow strip 23 that frames the field of the truncated pyramid-shaped elevations 19 completely, as a closed polygon, without any breaks. The top of this strip 23, each of whose side walls are formed from the surfaces of the appropriate side walls 5 . . . 9 that lie on the outside of the clamp plate section 1, is once again in the plane of the top surfaces 22. In other words, the top 4 that in and of itself is flat, has grooves 17 and 18 that pass through it, and is thus divided into small surface areas.

Figure 2:
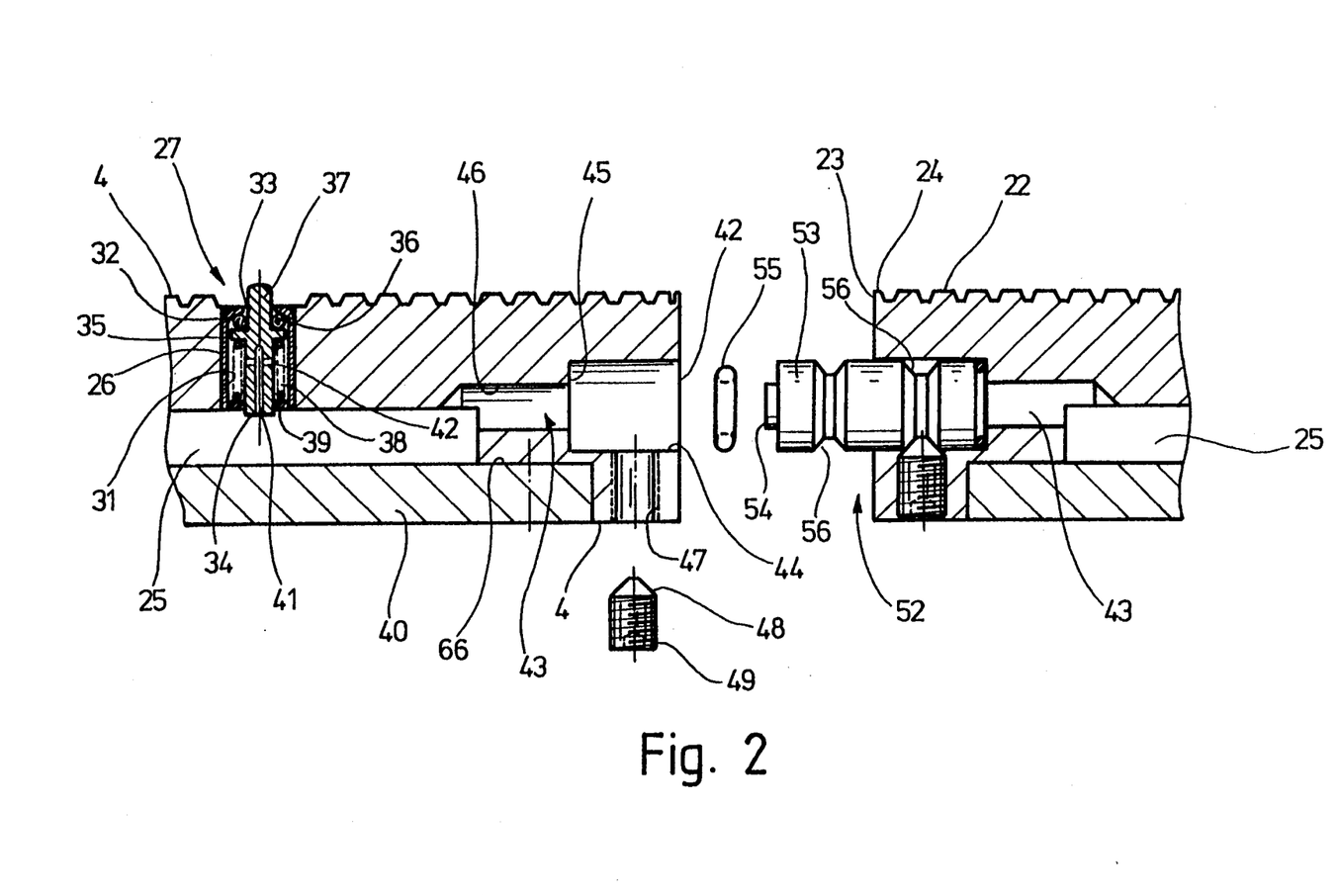
FIG. 2 is a cross-sectional exploded view of the connection between two adjacent clamp plate sections as shown in FIG. 1.

At its mid-point, between the side surfaces 5 and 8, and also at the approximate mid-point between the corners 13 and the widest part of the T-groove 16, the upper side 4 incorporates a bore 26, as can be seen in FIG. 2, and this leads downwards into a chamber 25. There is a valve 27 in this bore 26. This valve 27 consists essentially of an outer cylindrical valve housing 28 that has a fine thread on its outer peripheral surface (not shown in the drawings), with which it can be screwed into a thread in the bore 26 so as to form a gas-tight seal. Within the valve housing 28 there is a bore 31 that tapers down to the top 4 through a conical shoulder 32 to a cross-section 33 that is of smaller diameter. An essentially cylindrical valve closing element 34, which can move longitudinally, is accommodated in the bore 33; at its mid-point this has an annular collar 35. This annular collar 35 presses an O-ring seal 36 against the truncated conical shoulder 32 in order to close the flow path from the bore section 33 to the bore 31.

The valve closing element 34 continues upwards through the annular collar 35 to a cylindrical peg 37, the unattached end of which extends slightly above the plane defined by the top 4.

A compression spring 38 acts against the lower side of the annular collar 35 and at the other end of this is supported in an annular washer 39 that is pressed into the bore 31.

In order to improve the flow of gas through the open valve 27, the valve closing element 34 incorporates a blind bore 41 beneath the annular collar 35, and a transverse bore 41a passes through this below the annular collar 35.

Thus, the bore 26 forms a channel through which the top 4 can be connected to the chamber 25 through the valve 27, so as to provide a flow and so that it can be closed. In addition, the chamber 25, which is closed off to the underside 3 by a flat cover 40 that can be bolted on, is connected by another channel to the side surfaces 5, 6, 7, and 8. The opening of each such connecting channel is formed by an associated opening 42. The connecting channel that leads away from the opening 42 consists of a stepped bore 43 that either opens out directly into the circular chamber 25 or runs radially to this, or opens out into a second auxiliary bore (not shown herein) and which, in its turn, leads to the chamber 25. As an example, the bores 43 that extend from the two side surfaces 5 and 8 open out directly into the chamber 25, whereas the stepped bores 43 that extend from the side surfaces 6 and 7 open out into a bore (not shown herein) that is closed off by the stopper (not shown herein) that is made starting from the side surfaces 5, 8, respectively. All that is important is that the area of the particular bore 43 that is immediately adjacent to the opening 42 is of the form that can be seen in FIG. 2. Thus, next to the opening 42, the bore 43 consists of a section 44 of large diameter that becomes a bore section 46 that is of smaller diameter at a flat annular shoulder 45. The distance between the annular shoulder 45 and the opening 42, i.e., from the associated side surfaces 5 . . . 8 is in each instance always identical.

A threaded bore 47 opens into the bore section 44 from the underside 3. The bore 47 accommodates a threaded pin 49 that has a tip 48.

The position of the openings 42 in each of the side surfaces 5 . . . 8 is so selected that if two clamp plate sections 1, 2 lie with their side surfaces against and even with each other, the openings 42 and the bores 43 that extend at right angles from these surfaces will register with each other. This means that the mid-point of the opening 42, for example, in the side surface 7, lies at the point of intersection of the diagonals of the rectangular side surface 7. As a consequence, the opening 42 in the side surfaces 3 or the side surface 8, respectively, is at the same distance from the adjacent corners 12 or 14 as the opening 42 in the side surface 6 or 7 from this corner 12 or 14.

In addition, next to each opening 42, symmetrically distributed, there are two precision bores 51 (FIG. 1) in which precision pins (not shown herein) are inserted, with scarcely any free play.

In order to couple clamp plate sections 1, 2 to each other there are connecting elements 52 that consist of an essentially cylindrical section of pipe 53. The pipe section 53 is stepped down at both end faces so that a cylindrical connector piece 54 of smaller diameter results, the outside diameter of which equals the inside diameter of an O-ring that is centered thereon and which is shorter than the thickness of the O-ring 55.

Spaced from the face surfaces, the cylindrical base body 53 (whose outside diameter matches the inside diameter of the counterbore 44) incorporates two trapezoidal section annular grooves 56, the relative positions of which is described in detail in the following description.

Openings 42 that are not required are sealed off by plugs (not shown) that have the external Shape of a "half" coupling piece 52 and which are not in the form of pipes, like the coupling piece 52, but are solid.

Figure 5:
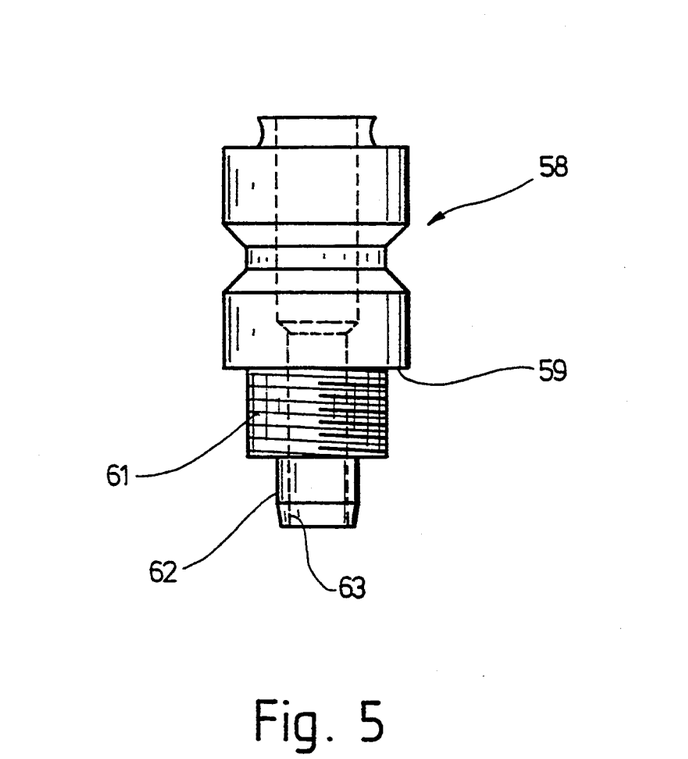
FIG. 5 is a connecting piece that can be inserted in a clamp plate section and used to connect an external vacuum source, shown in side view.

The connector piece 58 that is shown in FIG. 5 is used to connect the clamp plate section 1, or a vacuum plate assembled therefrom, to a vacuum source. If this is the section that sits in the counterbore 44, this is the same shape as the "half" coupling piece 52 for which reason the same reference numbers are used. In place of the other half of the coupling piece 52, on the appropriate face end 59 there is a threaded section 61 that becomes a nipple 62 of smaller diameter. A bore 63 passes through the whole of the coupling piece 58.

As is shown in FIG. 1, the clamp plate section 1 differs from the clamp plate section 2 only insofar as the angle of the side surfaces 6 and 7 at the corner 13 is not 240° but rather 120° which means that the corner 13 does not extend outwards and is not set back, inwards, as in the clamp plate section 1. Accordingly, the inside angle at the corners 12 and 14 is not 60°, as before, but rather 120°. Finally in the sectors that are defined by the corners 12 and 13 and the valve 27 or 13 and 14 and the valve 27, the grooves 17 run at right angles to the particular side walls 7 or 6, whereas the grooves 18 are parallel to the side walls 6 or 7.

Figure 3:
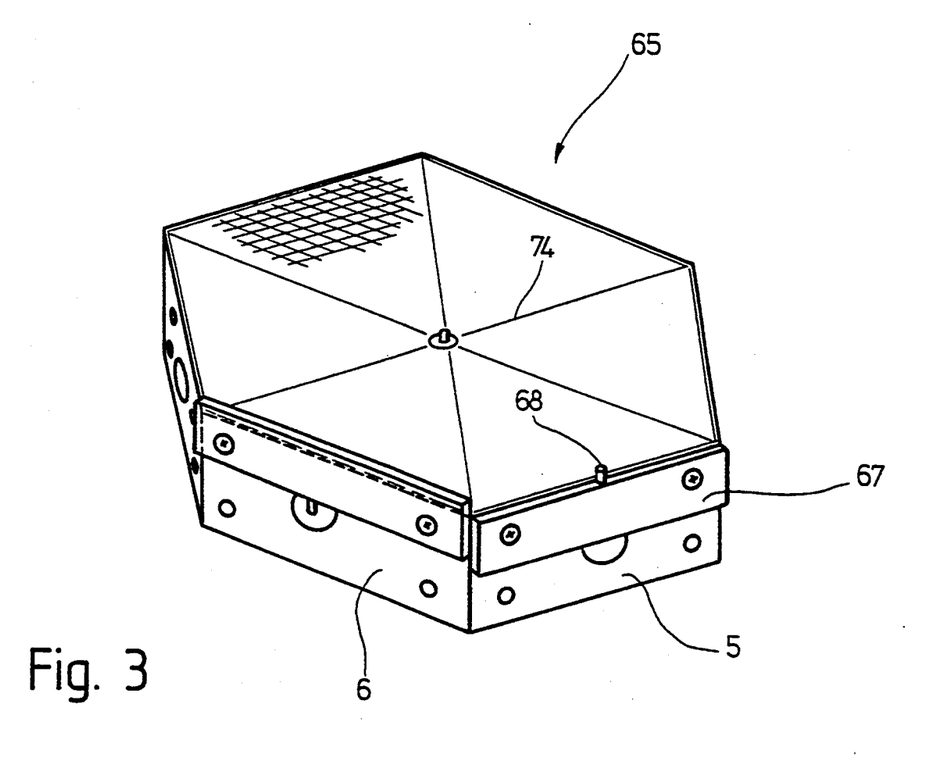
FIG. 3 is another basic form of the clamp plate section that can be used in conjunction with the clamp plate section shown in FIG. 1, shown in perspective view.

Apart from the pentagonal clamp plate sections 1 and 2 shown in FIG. 1, in the new embodiment of a vacuum clamp plate, FIG. 3 shows a hexagonal clamp plate section 65, the base outline of which is in the form of a regular hexagon. This clamp plate section 65 is also defined by an upper surface 4 and an under surface 3 that is parallel to the upper surface 4. The thickness of the clamp plate section 25, i.e., the distance of the upper surfaces 22, formed on the top 4, from the under surface 3 is exactly the same size as in the clamp plate sections 1 and 2 shown in FIG. 1. What is different, apart from the different corner angles, is simply the fact that on all side surfaces 5 . . . 10 that are equal to each other, there are openings 42 from which stepped bores 42 lead into the chamber 25 that is located inside the clamp plate section 65.

The clamp plate sections 1, 2, and 65 described above can be assembled as follows to form a vacuum clamp plate of almost any size.

It is assumed that only the two clamp plate sections 1 and 2 shown in FIG. 1 are coupled to each other. To this end, cylindrical precision pegs are inserted into the precision bores 51, for example in the side surface 7. As can be seen in FIG. 2, the coupling piece 52 with an O-ring 55 inserted is plugged into the opening 42 in this same side surface and the threaded pin 49 is tightened. The tip of this pin 48 passes into the groove 56 when tightening the threaded pin 49 presses the coupling piece 52 against the adjacent shoulder 45 because of the interaction between the tip 48 and the appropriately inclined groove 46. This compresses the O-ring 55 between the coupling piece 52 and the annular shoulder 45, so as to form a seal. At the same time, there is positive locking between the clamp plate section 1 and the coupling piece 52 that is inserted into the side wall 7. This position is shown in the right-hand section of FIG. 2.

The opening 42 in the side wall 6 is sealed off in a similar way by a plug which, as described above, looks like a "half" coupling piece 52 and which is solid. After the insertion of this plug into the opening 42 the plug does not project beyond the particular side surface 6. Next, in the case of the clamping plate section 2, the opening 42 in the side wall 7 (with the side wall in the position shown in FIG. 1, it lies opposite the clamp plate section 2) is closed in the same way as described with respect to clamp plate section 1. In contrast to this, the opening 42 in the side wall 6 (which lies opposite the side surface 7 in the clamp plate section 1) remains open.

To the extent that the two clamp plate sections 1 and 2 have been prepared, the clamp plate section 2 with the as yet unclosed opening 42 is slid onto the coupling piece 52 that extends from the side surface 7 and this then passes into the appropriate stepped bore 42. At the same time, the two precision pins that have been inserted slide into the associated precision bores 51 in clamp plate section 2.

FIG. 2 shows the side surfaces 6 and 7 that are opposite each other directly before they are joined together. As soon as this has been done, as has been described above, the threaded pin 49 is screwed into the associated threaded bore 47 from below in order to secure the coupling piece 52 in the other clamp plate section 2 so as to form a positive fit and to press it against the appropriate annular shoulder 52. After the threaded pin 49 has been tightened, the two clamp plate sections 1 and 2 are connected positively and mechanically to each other and in addition, there is a flow connection between the two chambers 25 of the two clamp plate sections 1 and 2 through the coupling piece 52. The position of the grooves 56 and the length of coupling piece 52 are such that when the threaded pins 49 are tightened it is ensured, on the one hand, that the O-rings 55 are clamped between the clamp plate sections 1 and 2 and the coupling piece 52. On the other hand, in this position, the side surfaces 6 and 7 of the two clamp plate sections 1 and 2 abut one against the other, with no gap. Then, the projecting corner of clamp plate section 2 moves into the set-back corner 13 of clamp plate section 1. This results in a vacuum clamp plate that is of rectangular shape, with the upper side 4 and the lower side 3 of the two clamp plate sections 1 and 2 aligned with each other. In the same way, the side surface 5 makes a smooth transition without any irregularities into the side surface 8 of the other clamp plate section 1 or 2.

In the event that this has not been done before, all the openings 42 except one that are incorporated in the side surfaces 5 and 8 can now be sealed so as to be gas-tight by plugs, as has been described above. The connector piece shown in FIG. 5 is inserted into only one of the openings 42, in the same way as has been described above in connection with the coupling piece 52. Now, in known manner, a line that leads to a vacuum source can be connected to this connector piece.

The vacuum clamping plate that has been prepared thus is now secured to the table of a machine tool, for example, by clamping shoes or a magnetic clamp plate.

In order to secure a work piece to the vacuum clamp plate, a rubber cord is inserted into the groove 17, 18 of the two clamp plate sections 1 and 2, this corresponding to the outside shape of the work piece that is to be clamped. Because of the joint between the two clamp plate sections 1 and 2, however, the total surface of the work piece is divided into two fields, with one field being on one clamp plate section and the other field being on the other clamp plate section. The enclosing strip 23 simplifies the insertion of the seal at the point of contact between the two clamp plate sections 1 and 2. When this is done, all that has to be ensured is that each field that is enclosed by a sealing cord encloses the valve 27 that is located therein. If the work piece is now placed on the vacuum clamp plate, it presses the valve closing element 28 down by the pin 33 which means that the flow connection between the underside of the work piece and the vacuum chamber 25 is established. The vacuum source that is connected to the clamp plate sections 1 and 2 can now become effective in order to draw the work piece down onto the top 4 and secure it there. Because of the fact that not only the positive mechanical connection between the clamp plate sections 1 and 2 is produced by the coupling piece 52, but that the flow connection is also established thereby, the same vacuum is effective in all the vacuum chambers 25 of all the clamp plate sections 1 and 2, without any external and additional lines having to be connected.

In the event that a vacuum plate as in FIG. 1 is to be assembled from only clamp plate section 1 and 2 is too small, it is possible, without any difficulty, to install additional clamp plate sections 1 and 2 next to the clamp plate sections 1 and 2, which is to say on the side surfaces 5 and 8; when these two additional clamp plate sections 1 and 2 are then connected to each other as has been described above. The connection to the clamp plate sections 1 and 2 shown in FIG. 1 is then best effected through coupling pieces 52 that are inserted both in the side surface 5 and in the side surface 8 in order to form the largest number of positive connections. At the same time, the flow connection is also established in each instance.

Figure 4:
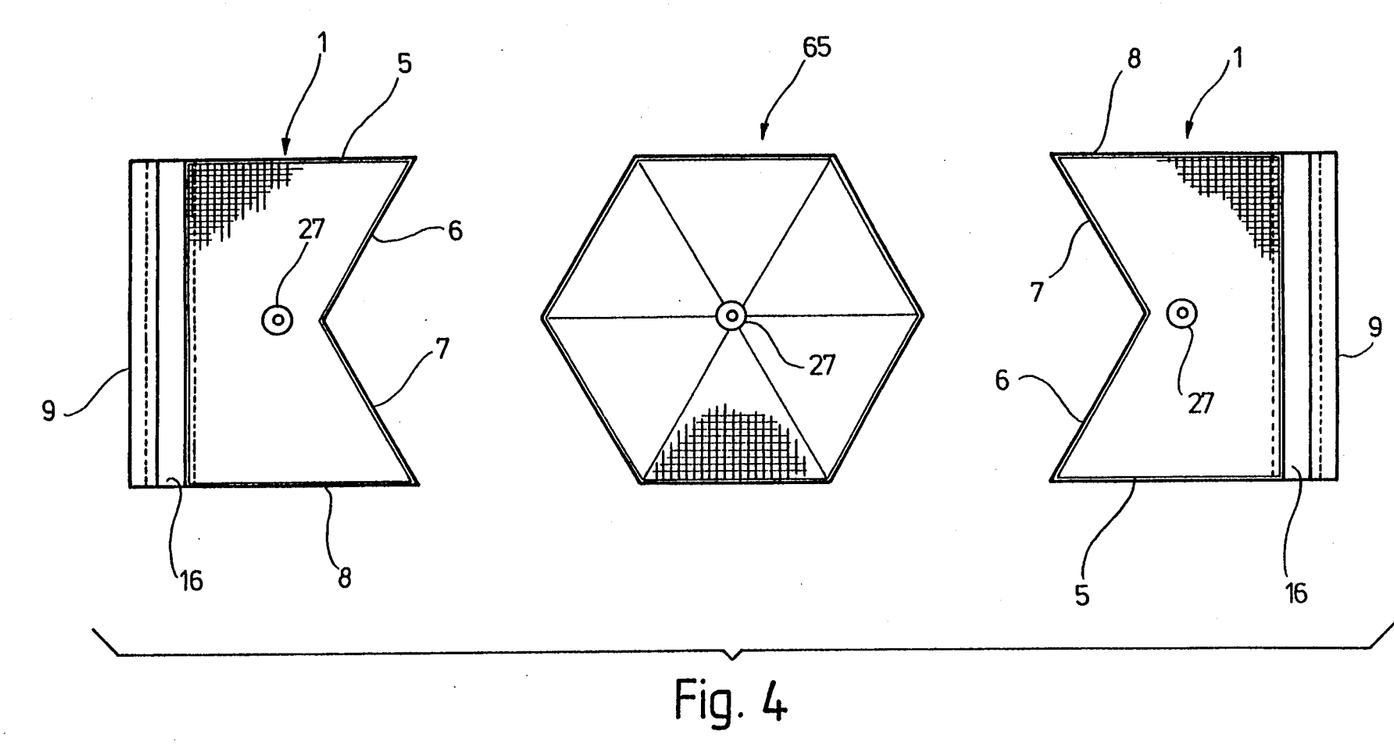
FIG. 4 is a plan view of a further combination of clamp plate sections shown unassembled.

Not only is an extension in the direction parallel to the longitudinal extent of the T-groove 16 possible, but it is also possible to effect a widening, to which end, in the simplest embodiment, the configuration shown, for example, in FIG. 4 is used. In this case, two clamp plate sections 1 are combined with a clamp plate section 65. The mechanical connection at the points of contact is effected in the manner described heretofore, in connection with FIG. 1. When this is done, the advantage of the system that is based on the hexagonal basic pattern, as is shown in the Figures, lies in the fact that in most applications the point of contact between adjacent clamp plate sections is not parallel to the work pieces that, as a rule, are rectangular, but are at an angle of 120° or 160°. In the case of thin wall parts, down to wall thicknesses of approximately 0.5 mm, during metal cutting operations, the points of contact between adjacent clamp plate sections that are parallel to the work piece edges are clearly seen as variations in wall thickness because the work piece is not drawn down by the vacuum at the point of contact. At the point of contact, the work piece can spring upwards between adjacent seal sections; at the wall thicknesses quoted above, and when this happens, for example, in aircraft construction, when they are milled from a single piece, this will result in visible changes in wall thickness. For this reason, the strip 32 is to be kept as narrow as possible, for example, less than half the width of the top surfaces 22.

As has been shown in practice, a suitable compromise between the size of the clamp plate section and the number of clamp plate sections required to construct a vacuum clamp plate results if the length of the side surfaces 6 and 7, measured between two adjacent corners, is approximately 70 mm, when even at a thickness of the clamp plate section, as measured between the upper and the lower side, of 40 mm, sufficient rigidity will be achieved, especially since the vacuum chamber 25 within the clamp plate sections 1, 2, or 65 does not have an adverse effect on torsional stiffness.

In order to save weight, the base body of the clamp plate section 1, 2, or 65 is preferably of aluminum, for which reason the cover 40, with which the vacuum chamber 25 is closed off so as to be air-tight, consists of an appropriately thick circular steel plate that can be bolted onto a shoulder 66 that projects into the chamber 25 in order that, should it be necessary, the vacuum clamp plate that is composed of clamp plate sections can be secured to a magnetic clamping plate.

The T-grooves 16 that extend on the outer side are used as described in DE-PS 38 38 988.

When it is important to hold the work piece in the area of the side surfaces 6, 7, 5, or 8, as well, threaded bores 66 that are in the form of blind bores can be used in these side surfaces, and the stop rails 67 that are shown in FIG. 3 can be screwed onto these. On one side, these stop rails 67 have pegs 68 which extend upwards at their approximate mid-points and extend beyond the top 4. If, in contrast to this, the rails are mounted in the other position, in which the pegs 68 extend downwards, their whole length extends beyond the top 4. This case is shown in FIG. 3 on the side wall 6, whereas the case with the pins 68 pointing up is shown in conjunction with the side surface 5.

Figure 6:
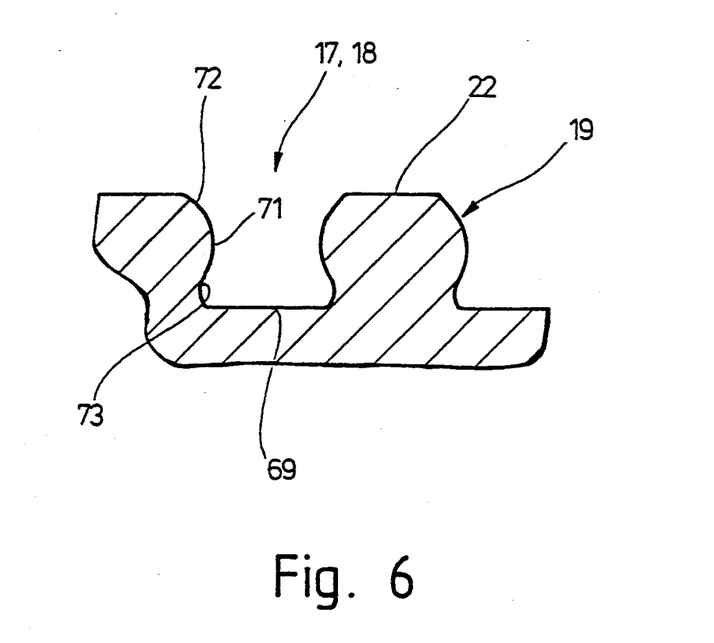
FIG. 6 is a cross-section through one of the grooves in the groove grid.

In order to improve the retention of the sealing cord in the grooves 17 and 18, these grooves 17 and 18 can be provided with a cross-section as is shown in FIG. 6, in which they are undercut slightly in the vicinity of the bottom 69 of the groove. The cross-section of the grooves 17 and 18 consists of a section 71 that has parallel sides and which is set back somewhat relative to the upper sides 4 or the top surfaces 22 and which makes a transition to become a rounded shoulder 72 towards the top surface 22. At the lower end of the section 71 there is a slight recess 73 in which the side wall of the groove is set back by approximately 0.1 mm to 0.3 mm relative to the parallel sides of the section 71. The sealing cords normally used are of closed cell foam rubber, and because of this they display a tendency to remain in the grooves 17, 18 even if there are no forces pressing the seal into the grooves 17 and 18. In addition, it has been found to be useful if the effective surface area measures approximately 3×3 mm and the width of the groove at the widest point similarly amounts to approximately 3 mm because of the rounded shoulders 72. Because of this, good contact pressure is achieved as a result of the vacuum and on the other hand, however, the top surfaces 22 are largely prevented from being pressed into the thin walled work pieces. For this reason, there are no grooves that run in the direction of these lines even if the groove fields merge into each other, as indicated by the thin continuous lines 74. Because of these, under unfavorable circumstances, there would be top surfaces 22 which would fail to have the desired area of 0.9 cm². On the other hand, there must be no lack of such undersized elevations 19 in the transition areas because retention of the sealing cord would then be adversely effected.

I claim:

1. A vacuum plate having at least two clamping plate sections (1, 2, 64), that can be assembled in a modular fashion, each of these sections comprising:
    a top (4) side formed with a grid or pattern of grooves (17, 18) in which elevations (19) that are formed by this grooved grid (17, 18) form a supporting surface for a work piece,
    an underside (3) that is spaced apart from the top (4), the distance between the top (4) and the underside (3) being equal in all clamp plate sections (1, 2, 64),
    at least one of side wall (6 . . . 10), that extend between the top (4) and the underside (3),
    a chamber (25) formed within the clamping plate sections (1, 2, 64),
    at least one duct (26) connecting the chamber with the grooved grid (17, 18) and from which connecting duct or ducts lead to the, or each side wall (6 . . . 10), in order to connect the chambers (25) of the clamp plate sections (1, 2, 64) that are connected to each other to enable a flow of gas therebetween or to selectively connect a vacuum source to the vacuum clamp plate, and
    a valve (27) located in the duct (26) that leads to the top side (4), and having a valve operating element (37) that extends above the work piece support surface, and which opens the valve (27) when the work piece is put in position;
    said vacuum plate further having at least one T-groove (16) formed in the top, which T-groove extends in the vicinity of the at least one side wall (9); and
    at least one tubular coupling element (52) to rigidly connect at least two clamping plate sections (1, 2, 64),
    wherein said at least one tubular coupling element (52) further provides fluid communication between the chambers (25) of the clamping plate sections (1, 2, 64) while sealing the sealing chambers (25) with respect to the environment.

2. A vacuum clamp device as defined in claim 1, characterized in that the clamping plate section (64) has a base outline in the form of a hexagon, optionally in the form of a regular hexagon.

3. A vacuum clamp device as defined in claim 1, characterized in that the clamping plate section (2) has a pentagonal base outline, the corner angle at two adjacent corners (11, 15) being 90° and the angle at one corner (13) that is not adjacent to the 90° corner, being 120°.

4. A vacuum clamp device as defined in claim 1, characterized in that the clamping plate section (1) has a pentagonal base shape, the corner angle at two adjacent corners (11, 15) being 90° and the corner angle at the corner (13) that is not adjacent to the 90° corner, being 240°.

5. A vacuum clamp device as defined in claim 3, characterized in that the length of the side surfaces (6, 7) that are adjacent to the corner (13) at a corner angle of 240° or 120°, respectively, is equal one with the other.

6. A vacuum clamp device as defined in claim 3, characterized in that the T-groove (16) extends parallel to the side wall (9) that is adjacent to the two corners (11, 15) of 90°.

7. A vacuum clamp device as defined in claim 1, characterized in that the top (4) and the underside (3) of each clamping plate section (1, 2, 64) are congruent.

8. A vacuum clamp device as defined in claim 1, characterized in that the side walls (6 . . . 10) extend at right angles to the top and the underside (3, 4) of each clamping plate section (1, 2, 64).

9. A vacuum clamp device as defined in claim 1, characterized in that a cover (40) for the chamber (25) is provided; the chamber (25) within the clamping plate section (1, 2, 64 is formed by a recess that is open towards the underside (3) and which is of circular cross-section, within which a shoulder (66) projects radially inwards on which the cover (40) can be installed so as to form a seal.

10. A vacuum clamp device as defined in claim 1, characterized in that in the clamping plate section (1, 2, 64) is ferromagnetic on its underside.

11. A vacuum clamp device as defined in claim 9, characterized in that only the cover (40) that closes off the chamber (25) in the respective clamping plate section is ferromagnetic.

12. A vacuum clamp device as defined in claim 1, characterized in that the connecting channels (43) lead to openings located in the side walls (5 . . . 8, 10); and in that the center of the opening (42) lies, at least in one side wall (6, 7, 8, 10) of the clamping plate section (1, 2, 64) at the point of intersection of the diagonals of these side walls (6, 7, 8, 10).

13. A vacuum clamp device as defined in claim 1, characterized in that the openings (42) of the connecting channels (43) in the side walls (5 . . . 8, 10) are formed by stepped bores that taper in the direction of the chamber (25).

14. A vacuum clamp device as defined in claim 13, characterized in that, at right angles to the stepped bores (43), there is a threaded bore (47) that opens out into the stepped bores (43);
said threaded bore extending from the underside (3) of the clamping plate section (1, 2, 64) and opening out into the stepped bores (43) at a distance from a shoulder (45) that is formed by the steps of the stepped bores (43).

15. A vacuum clamp device as defined in claim 14 characterized in that the coupling element (52) connects the chambers (25) of two adjacent clamping plate sections (1, 2, 64) so as to provide for fluid communication,
said coupling element having circular annular grooves (56) in its outer peripheral surface, spaced from the end of the tubular coupling element (52) by the distance which equals the distance of the shoulder (45) of the stepped bore (43) from the axis of the threaded bore (47), to permit screwing of a pointed threaded pin (49) into the threaded hole (47) to press the coupling element (52) onto the shoulder (45) of the stepped bore (43).

16. A vacuum clamp device as defined in claim 1, characterized in that the side walls (5 . . . 8, 10) incorporate precision bores (51) which, when the corresponding side walls (5 . . . 8, 10) are adjacent to each other align the clamping plate sections (1, 2, 64) with each other and serve to accommodate precision pins.

17. A vacuum clamp device as defined in claim 1, characterized in that the valve (27) incorporates a housing (28) that has a central bore (31), in which a valve closing element (33) is guided so as to be moveable, and which supports the valve activating element (37) that extends from the valve housing (28); and in that the valve closing element (33) is pretensioned elastically in the closed position.

18. A vacuum clamp device as defined in claim 17, characterized in that the housing (28) incorporates a bore (32) to allow passage of the valve activating element (33), and simultaneously serves as a passage opening for the valve (27).

19. A vacuum clamp device as defined in claim 18, characterized by the bore (32) has a cross-section of larger area that differs from the cross-section of the valve activating element (37).

20. A vacuum clamp device as defined in claim 1, characterized in that selectively removable and insertable plugs are provided to selectively close off the connecting channels.

21. A vacuum clamp device as defined in claim 13, characterized by at least one essentially cylindrical plug formed with peripheral groove, the distance of which from one face end equals the distance of the shoulder of the appropriate stepped bore from the center of the threaded bore.

22. A vacuum clamp device as defined in claim 1, characterized by a connecting piece (58) selectively insertable into one of the connecting channels (43) to selectively connect the vacuum clamping plate section (1, 2, 64) to the vacuum source.

23. A vacuum clamp device as defined in claim 14, characterized by a connecting piece (58) for connection of a connecting channel (43) to the vacuum source;
said connecting piece having a cross-section that is essentially of cylindrical shape, and is formed with a peripheral groove (56), the distance of this groove from the face end of the connecting piece (58) being equal to the distance of the shoulder (95) of the stepped bores (43) from the middle of the threaded bore (47), said connecting piece extending radially from the connecting channel (43).

24. A vacuum clamp device as defined in claim 1, characterized by a strip (23) enclosing at least one of the clamping plate sections (1, 2, 64) of the groove grid (17, 18), at least in part, said strip (23) following the shape of the clamping plate sections (1, 2, 64).

25. The vacuum clamp device as defined in claim 7, characterized in that in the clamping plate section (1, 2, 64) is ferromagnetic on its underside.

* * * * *